US012802914B2

(12) United States Patent
Gutmann et al.

(10) Patent No.: US 12,802,914 B2
(45) Date of Patent: Nov. 17, 2026

(54) CORE FOR A COIL

(71) Applicant: Tyco Electronics Austria GmbH, Vienna (AT)

(72) Inventors: Markus Gutmann, Vienna (AT); Philipp Harrer, Vienna (AT)

(73) Assignee: TE Connectivity Austria GmbH, Waidhofen an der Thaya (AT)

( * ) Notice: Subject to any disclaimer, the term of this patent is extended or adjusted under 35 U.S.C. 154(b) by 420 days.

(21) Appl. No.: 17/836,318

(22) Filed: Jun. 9, 2022

(65) Prior Publication Data

US 2022/0301799 A1 Sep. 22, 2022

Related U.S. Application Data

(63) Continuation of application No. PCT/EP2020/085152, filed on Dec. 9, 2020.

(30) Foreign Application Priority Data

Dec. 11, 2019 (EP) .................................... 19215178

(51) Int. Cl.
*H01H 50/36* (2006.01)
*H01H 50/18* (2006.01)
*H01H 50/44* (2006.01)

(52) U.S. Cl.
CPC ............ *H01H 50/44* (2013.01); *H01H 50/18* (2013.01); *H01H 50/36* (2013.01)

(58) Field of Classification Search
CPC ...................................................... H01H 50/36
USPC ............................................................ 335/84
See application file for complete search history.

(56) References Cited

U.S. PATENT DOCUMENTS 3,158,712 A * 11/1964 De Fligue .............. H01H 50/30 335/297
3,723,925 A * 3/1973 Alten ..................... H01H 50/36 335/196
3,825,865 A * 7/1974 Prouty ................. H01H 50/041 200/280

(Continued)

FOREIGN PATENT DOCUMENTS

AT 382739 B 4/1987
CN 110085483 A 8/2019

(Continued)

OTHER PUBLICATIONS

Japanese Office Action dated Nov. 21, 2023 with English translation, corresponding to Application No. 2022-534687, 8 pages.

(Continued)

*Primary Examiner* — Alexander Talpalatski
(74) *Attorney, Agent, or Firm* — Barley Snyder

(57) ABSTRACT

A core for a coil of a switching device includes an armature abutment section abutting an armature in a closed condition, an armature bearing section mounting the armature to the core, and a coil section receiving a coil and extending along a longitudinal axis from the armature abutment section to the armature bearing section. The coil section and at least one of the armature abutment section and the armature bearing section extend along separate planes offset from one another perpendicular to the longitudinal axis.

20 Claims, 3 Drawing Sheets

(56) References Cited

U.S. PATENT DOCUMENTS 4,290,037 A * 9/1981 Inagawa ................ H01H 50/28 335/202
4,292,613 A * 9/1981 Bando .................. H01H 50/043 335/106
4,356,465 A * 10/1982 Agatahama ........ H01H 51/2227 29/622
4,831,348 A * 5/1989 Agatahama ........ H01H 51/2227 335/128
4,843,360 A 6/1989 Yoshino et al.
4,857,875 A * 8/1989 Matsuo ..................... H01F 3/00 335/297
4,881,053 A * 11/1989 Tanaka ................. H01H 51/229 335/85
4,975,666 A * 12/1990 Nobutoki ........... H01H 51/2281 335/85
4,993,787 A 2/1991 Tanaka et al.
5,216,396 A * 6/1993 Stahly .................... H01H 50/28 335/78
5,627,503 A * 5/1997 Mader .................... H01H 50/26 335/78
5,734,308 A * 3/1998 Dittmann ............... H01H 50/36 335/78
5,945,900 A * 8/1999 Shibata .................. H01H 50/36 335/130
6,014,068 A * 1/2000 Nobutoki ............... H01H 50/36 336/208
6,144,270 A * 11/2000 Mader .................... H01H 50/24 335/78
7,157,994 B2 1/2007 Minowa et al.
9,401,256 B2 * 7/2016 Fujimoto ............... H01H 50/36
10,811,204 B2 * 10/2020 Nakahata ............... H01H 50/44
2003/0016104 A1 * 1/2003 Mader .................. H01H 50/042 335/129
2005/0242907 A1 * 11/2005 Minowa ............... H01H 50/443 335/129
2006/0022778 A1 2/2006 Minowa et al.
2006/0250201 A1 11/2006 Hashimoto et al.
2009/0267715 A1 * 10/2009 Fukui ................... H01H 50/163 335/156

FOREIGN PATENT DOCUMENTS

DE 3539341 A1 5/1986
EP 1592036 A1 11/2005
JP 2001523380 A * 11/2001 ............. H01H 50/24
JP 2003045309 A 2/2003
JP 2005317434 A 11/2005
JP 2006179354 A 7/2006
JP 2007059240 A 3/2007
JP 2013182711 A 9/2013
JP 2015035319 A 2/2015

OTHER PUBLICATIONS

PCT International Search Report and Written Opinion, Application No. PCT/EP2020/085152, dated Feb. 11, 2021, 12 Pages.
Extended European Search Report, Application No. 19215178.5-1202, dated May 4, 2020, 6 pages.
Japanese Office Action dated Jun. 6, 2023 with English translation thereof, corresponding to Application No. 2022-534687, 11 pages.
Chinese Office Action dated Dec. 19, 2024 with English translation, corresponding to Application No. 202080085155.3, 15 pages.

* cited by examiner

CORE FOR A COIL

CROSS-REFERENCE TO RELATED APPLICATIONS

This application is a continuation of PCT International Application No. PCT/EP2020/085152, filed on Dec. 9, 2020, which claims priority under 35 U.S.C. § 119 to European Patent Application No. 19215178.5, filed on Dec. 11, 2019.

FIELD OF THE INVENTION

The invention relates to a core for a coil, in particular of a switching device, such as an electromagnetic relay.

BACKGROUND

Cores are designed to carry a coil and are used in switching devices, such as an electromagnetic relay. Usually the coil is wound around a bobbin as a permanent container for the wire to retain its shape and rigidity, as well as to ease the assembly of the windings onto the core. Switching devices are widely used, for example, in home appliances, automation systems, communication devices, remote control devices and automobiles. The function of the switching devices can vary for each application, whereby the applications are often subjected to various size constraints. Consequently, it is a constant desire to provide smaller, particularly slimmer, switching devices. Presently, the width of the switching devices is determined by the core and/or the coil.

SUMMARY

A core for a coil of a switching device includes an armature abutment section abutting an armature in a closed condition, an armature bearing section mounting the armature to the core, and a coil section receiving a coil and extending along a longitudinal axis from the armature abutment section to the armature bearing section. The coil section and at least one of the armature abutment section and the armature bearing section extend along separate planes offset from one another perpendicular to the longitudinal axis.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
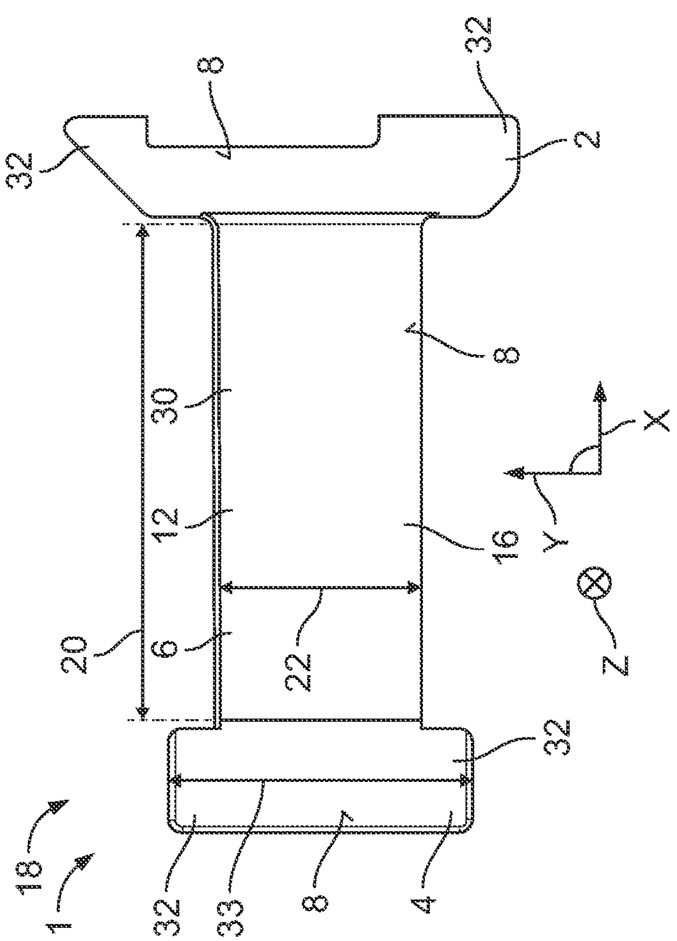
FIG. 1 is a front view of a core according to an embodiment.

In the following, a core and an electromagnetic assembly according to the invention are explained in greater detail with reference to the accompanying drawings, in which exemplary embodiments are shown. In the figures, the same reference numerals are used for elements which correspond to one another in terms of their function and/or structure. According to the description of the various aspects and embodiments, elements shown in the drawings can be omitted if the technical effects of those elements are not needed for a particular application, and vice versa, i.e. elements that are not shown or described with reference to the figures, but are otherwise described herein, can be added if the technical effect of those particular elements is advantageous in a specific application.

Figure 2:
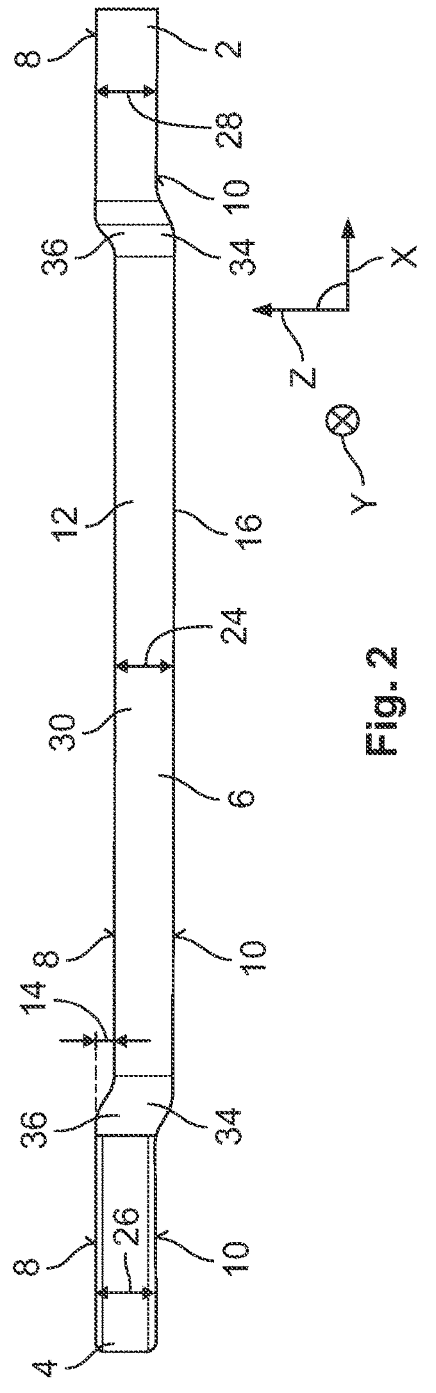
FIG. 2 is a top view of the core.

First, an exemplary embodiment of a core 1 according to the invention is elucidated with reference to FIGS. 1 and 2.

The core 1 for a coil, in particular of a switching device such as an electromagnetic relay, comprises an armature abutment section 2 for abutting an armature in a closed condition, an armature bearing section 4 for mounting the armature to the core 1, and a coil section 6 for receiving the coil. The coil section 6 extends along a longitudinal axis X from the armature abutment section 2 to the armature bearing section 4. In order to provide a core 1 which allows for an assembly of a slimmer switching device, the coil section 6 and at least one of the armature abutment section 2 and the armature bearing section 4, and in an embodiment both, extend along separate planes being offset from one another perpendicular to the longitudinal axis X.

The core 1 may be elongated along the longitudinal axis X, having a longitudinal thin shaped body, meaning that the core 1 may have a length in a direction essentially parallel to the longitudinal axis X, a height in a direction essentially parallel to a vertical axis Y, and a material thickness in a direction essentially parallel to a lateral axis Z, each axis being arranged perpendicular to one another, wherein the length is larger than the height and the height is larger than the material thickness. The separate planes are offset from one another essentially parallel to the lateral axis Z.

Each section may comprise an essentially planar flat face 8, as shown in FIG. 1, being essentially parallel to a plane spanned by the longitudinal axis X and the vertical axis Y. The flat face 8 of the coil section 6 may be laterally offset from at least one of the flat face 8 of the armature abutment section 2 and the flat face 8 of the armature bearing section 4. Consequently, the coil section 6 may be easily distinguished from the armature abutment section 2 and the armature bearing section 4. The flat face 8 of each section may favorably be arranged parallel to one another, wherein the normal of each flat face 8 may extend essentially parallel to the lateral axis Z.

In an embodiment, a flat face 10 of the coil section 6 facing the opposite direction to the flat face 8 of the coil section 6 may be laterally offset from at least one of the flat face 10 of the armature abutment section 2 and the flat face 10 of the armature bearing section 4, as shown in FIG. 2. In this embodiment, each flat face 8, 10 of the coil section 6 is laterally offset from the respective flat faces 8, 10 of the armature abutment section 2 and/or the armature bearing section 4, in the same direction. Therefore, the coil section 6 comprises a middle axis parallel to the longitudinal axis X which is laterally offset from the middle axis of at least one of the armature abutment section 2 and the armature bearing section 4, and in an embodiment both. Hence, the coil section 6 forms a lateral offset or crank 12 of the core 1.

In another embodiment, the flat faces 8, 10 of the coil section 6 may be laterally offset from the respective flat faces 8, 10 of the armature abutment section 2 and/or the armature bearing section 4 in opposite directions, forming a constriction of the core 1 parallel to the lateral axis Z.

Due to the offset, a play 14 in a direction essentially parallel to the lateral axis Z is provided between the flat face 8 of the coil section 6 and the respective flat face 8 of the armature abutment section 2 and/or the armature bearing section 4, as shown in FIG. 2. This play 14 may compensate for the width of the coil extending laterally from the flat face 8 of the coil section 6 when the coil is mounted on the coil section 6. Consequently, the width of the coil protruding from said side of the core 1 may be reduced, allowing for an optimal space saving assembly of the switching device.

The coil section 6 may be bent into the separate plane to offset the coil section 6 from at least one of the armature abutment section 2 and the armature bearing section 4. For providing an easy and cost-efficient way of forming the offset between the coil section 6 and at least one of the armature abutment section 2 and the armature bearing section 4, the coil section 6 may be formed as an embossment 16 of the core 1.

The armature abutment section 2 and the armature bearing section 4 may be aligned in a direction essentially parallel to the longitudinal axis X, meaning that the middle axis parallel to the longitudinal axis X of the armature abutment section 2 is aligned with the middle axis, parallel to the longitudinal axis X of the armature bearing section 4. The flat face 8 of the armature bearing section 4 and the armature abutment section 2 may be aligned with one another along the longitudinal axis X. In another embodiment, the armature abutment section 2 and the armature bearing section 4 may also be laterally offset from one another.

The armature abutment section 2, the armature bearing section 4, and the coil section 6 may be formed integrally with one another as a monolithic core 18. The core 1 may be a magnetic core, such as an iron core. In an embodiment, the core 1 may be formed of a soft magnetic material, i.e. a magnetizable material having a low coercivity such as hysteresis, silicon steel or ferrite. The core 1 or at least the coil section 6 may comprise a soft iron, since it does not retain its magnetism when the current is switched off; or in other words, it does not become permanently magnetized.

The armature abutment section 2 and the armature bearing section 4 may each form an end of the core 1, the ends being arranged opposite to one another along the longitudinal axis X, as shown in FIGS. 1 and 2. The coil section 6 may extend from the armature abutment section 2 to the armature bearing section 4 essentially parallel to the longitudinal axis X, having essentially a thin elongated cuboid form. In other words, the coil section 6 may have a length 20 essentially parallel to the longitudinal axis X, a height 22 essentially parallel to the vertical axis Y and a material thickness 24 essentially parallel to the lateral axis Z.

At least the armature bearing section 4 may comprise a material thickness 26 that is less than the material thickness 24 of the coil section 6. Consequently, an armature having a larger material thickness may be employed without increasing the total width dimension of the switching device.

The material thickness 26 of the armature bearing section 4 and a material thickness 28 of the armature abutment section 2 may be the same. However, it may be desirable to have a more rigid armature abutment section 2, so that it does not get deflected by the force of the armature pushing against the armature abutment section 2. Therefore, the material thickness 28 of the armature abutment section 2 may be larger than the material thickness 26 of the armature bearing section 4.

However, in order to keep the core 1 simple and easy to manufacture, in another embodiment the material thickness 24 of the coil section 6, the material thickness 26 of the armature bearing section 4 and the material thickness 28 of the armature abutment section 2 may be essentially the same.

As can be seen in FIG. 2, the coil section 6 may be formed as a constriction 30 of the core 1 in a direction parallel to the vertical axis Y. In other words, the armature abutment section 2 and the armature bearing section 4 may comprise wings 32, shown in FIG. 1, extending beyond the coil section 6 in a direction parallel to the vertical axis Y. Consequently, a height 33 of the armature bearing section 4 may be larger than a height 22 of the coil section 6 in the direction parallel to the vertical axis Y. Therefore, the magnetic flux at the armature bearing section 4 may be increased in order to mount the armature to the armature bearing section 4 and optimize the magnetic flux at the armature bearing section 4. The coil section 6 and the other sections may be further distinguished from one another.

The wings 32 of the armature abutment section 2 and the armature bearing section may extend parallel to one another, whereby the wings 32 of the armature abutment section 2 may extend further than the wings 32 of the armature bearing section 4. Therefore, a larger surface may be provided by the armature abutment section 2 for the armature, so that the force at which the armature abuts the armature abutment section 2 can be evenly distributed over a larger area. Furthermore, the magnetic flux at the armature abutment section 2 may be increased, allowing to overcome the air gap between the armature abutment section 2 and the armature in the open configuration.

The armature abutment section 2 and the armature bearing section 4 may comprise wings 32 extending beyond the coil section 6 at either side along the vertical axis Y. Therefore, the core 1 comprises an essentially H-shape, as shown in the embodiment of FIG. 1. The wings 32 may further aid in clearly distinguishing the coil section 6 from the armature abutment section 2 and the armature bearing section 4, and prevent the coil from slipping off of the coil section 6 in a direction essentially parallel to the longitudinal axis X.

At a transition area 34 between the coil section 6 and at least one of the armature abutment section 2 and the armature bearing section 4, shown in FIG. 2, a step 36 may be formed connecting the laterally offset parts of the core 1. The step 36 may be an inclined part of the coil section 6 being inclined to the longitudinal axis and connecting the part of the coil section 6 being arranged parallel to the longitudinal axis and the armature abutment section 2 and/or the armature bearing section 4, respectively.

Figure 3:
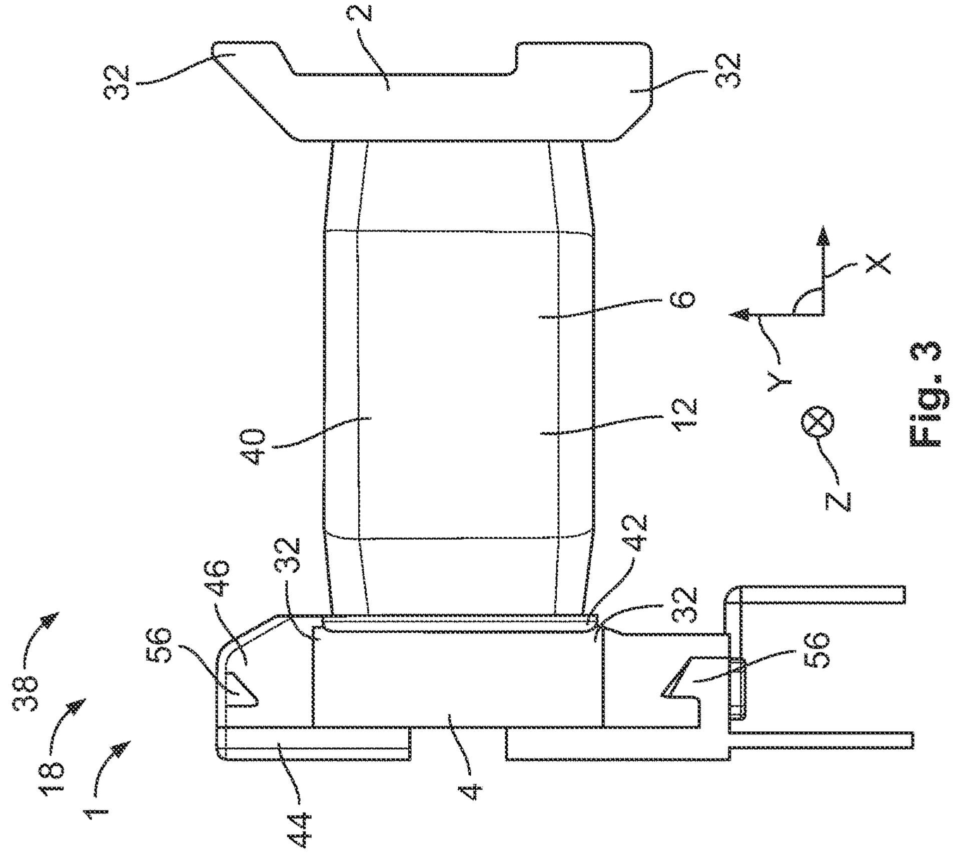
FIG. 3 is a perspective view of a magnet assembly according to an embodiment.

FIG. 3 shows a perspective view of an exemplary embodiment of a magnetic assembly 38 according to the invention. The magnetic assembly 38 comprises a core 1 and a coil 40 arranged on the coil section 6 of the core 1. When an electric current flows through the coil 40, a magnetic field is induced. The core 1 may confine and guide the magnetic field, greatly increasing the strength of the magnetic field.

The coil 40 may be directly wound onto the coil section 6, further reducing the size of the magnetic assembly 38, as no additional bobbin must be provided. However, a bobbin may also be formed by overmolding the coil section 6. The bobbin may be formed of a resin material and be adapted to securely hold the coil 40 in position.

To further separate the coil section 6 from at least the armature bearing section 4, a flange 42 may be provided at the transition area 34 between the coil section 6 and the armature bearing section 4. The flange 42 may secure the coil 40 at the coil section 6 and prevent the coil 40 from moving in a direction parallel to the longitudinal axis X. The flange 42 may be formed by overmolding and may comprise a resin material. The flange 42 may ensure that the mounted coil 40 retains its shape in the coil section 6.

To further facilitate the molding of the flange 42, the flange 42 may be formed integrally with a mounting bracket 44 as a monolithic part 46. Consequently, the flange 42 is a part of a larger component, which is easier to mold. The mounting bracket 44 is overmolded to the armature bearing section 4, and may be adapted to secure the armature in at least a direction essentially parallel to the longitudinal axis X.

In this embodiment shown in FIG. 3, the armature abutment section 2 directly acts as a flange for further securing the coil 40 at the coil section 6. However, an additional overmolded flange may be provided at the transition area 34 between the coil section 6 and the armature abutment section 2.

Since the coil section 6 comprises an elongated thin cuboid shape, the coil 40 wound onto the coil section 6 comprises a rectangular or oval shape in a cross section in a plane essentially perpendicular to the longitudinal axis X. Therefore, the width of the coil 40 is further reduced, allowing for an even slimmer assembly of the switching device.

Figure 4:
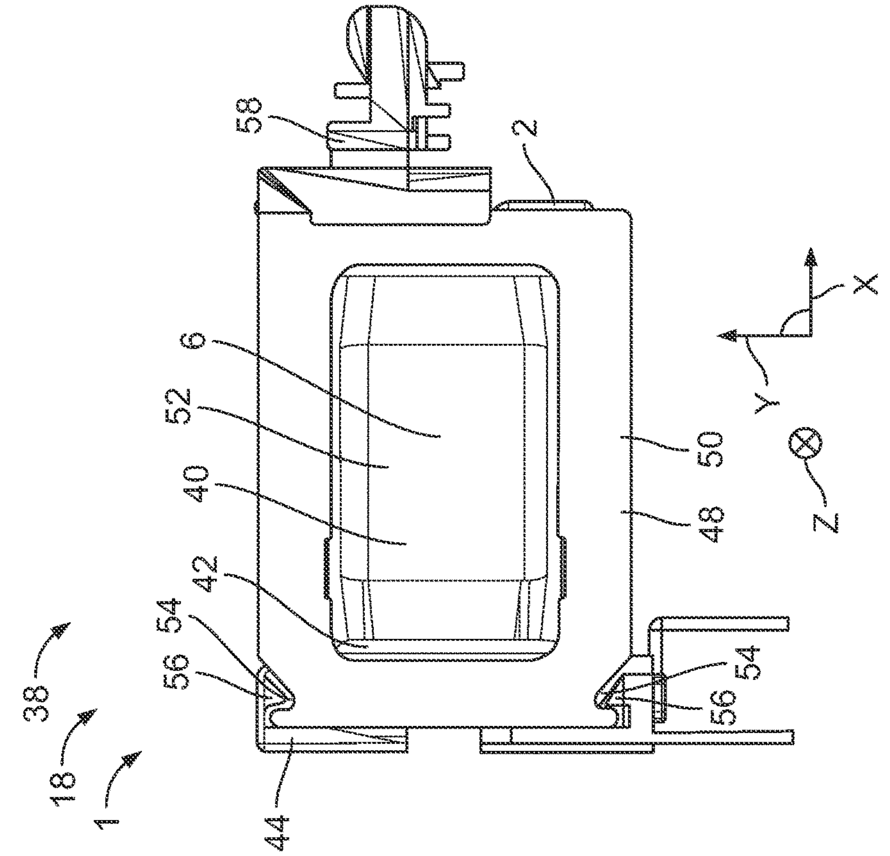
FIG. 4 is a front view of the magnet assembly with an armature.

FIG. 4 shows the magnetic assembly 38 of FIG. 3, wherein an armature 48 is mounted to the armature bearing area 4. The armature 48 may be essentially O-shaped, having a frame 50 framing an opening 52. The frame 50 may comprise an axially extending notch 54 on either side along the axial axis Y at the end mounted to the armature bearing area 4. The mounting bracket 44 comprises complementary formed locking latches 56 extending into the respective notches 54, forming a positive fit in the direction parallel to the longitudinal axis X.

The opening 52 may be aligned with the coil section 6, so that the coil section 6 may at least partially be received in the opening 52. Therefore, the width of the coil section 6 and the coil 40 at the side facing the armature does not negatively affect the width of the magnetic assembly, allowing the assembly of an even slimmer switching device.

The distal end of the frame 50, being distanced from the armature bearing section 4, may be aligned with the armature abutment section 2 so that the distal end of the frame 50 may abut the armature abutment section 2 at a closed position of the armature 48. The armature 48 may be adapted to directly contact a contact spring of the switching device, or may be provided with an actuating arm 58 molded to the distal end of the frame 50.

Figure 5:
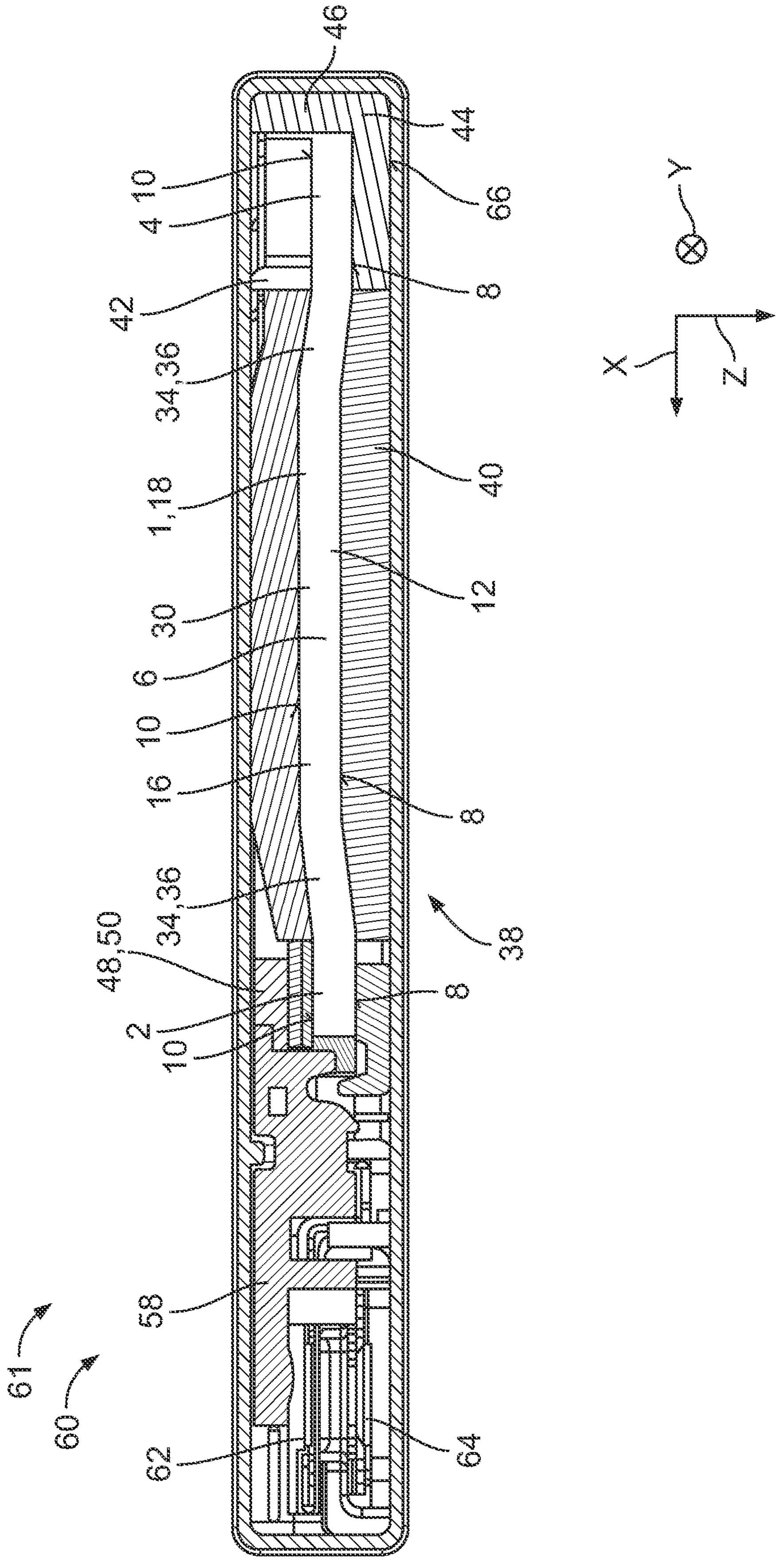
FIG. 5 is a sectional view of a switching device according to an embodiment.

A cut view of an exemplary embodiment of a switching device 60 is shown in FIG. 5. The switching device 60 may be an electromagnetic relay 61 and comprises a magnetic assembly 38 according to the invention.

The armature 48 may be moved from an open position, wherein the armature 48 is pivoted away from the armature abutment section 2 as shown in FIG. 5, to a closed position, wherein the armature 48 abuts the armature abutment section 2. By flowing an electric current through the coil 40, a magnetic field is formed, either attracting or repulsing the armature 48, causing a change of position of the armature 48. The provision of an additional magnetizeable element between the core 1 and the coil 40 is not required. The armature 48 may be mounted to the armature bearing section 4 via a spring, for example. The spring may cause a movement of the armature 48 to its initial position after the electric current of the coil 40 has been removed, so that the armature 48 is no longer attracted to or repulsed by the magnetic field.

The actuating arm transfers the movement to a contact spring 62, either closing or opening the contact between the contact spring 62 and a complementary contact spring 64.

As can be seen in FIG. 5, the coil section 6 may be laterally offset relative to the armature abutment section 2 and the armature bearing section 4 in a lateral direction pointing towards the armature 48. Consequently, the width of the coil 40 protruding from the side of the core 1 facing away from the armature 48 may be minimized. In an embodiment, the coil 40 does not protrude beyond a flat face 66 of the mounting bracket 44, further minimizing the width of the magnetic assembly 38. The offset may be set so that the coil 40 comprises an outer surface at the side facing away from the armature 48, which is aligned with the flat face 66 of the mounting bracket 44.

A switching device, such as an electromagnetic relay, may comprise a magnetic assembly 38 according to any of the above-mentioned configurations.

What is claimed is:

1. A core for a coil of a switching device, comprising:

an armature abutment section abutting an armature in a closed condition;

an armature bearing section mounting the armature to the core; and a coil section receiving a coil and extending along a longitudinal axis from the armature abutment section to the armature bearing section, the coil section and at least one of the armature abutment section and the armature bearing section extend along separate planes offset from one another perpendicular to the longitudinal axis, a step is formed at a transition area between the coil section and at least one of the armature abutment section and the armature bearing section, the step is an inclined part that is inclined to the longitudinal axis at an angle greater than 0° and less than 90° and connects a part of the coil section that is parallel to the longitudinal axis to a part of the armature abutment section and/or the armature bearing section that is parallel to the longitudinal axis, the armature abutment section and the armature bearing section each have a pair of wings extending beyond the coil section parallel to a vertical axis, the armature has a frame framing an opening, the coil section is at least partially received in the opening.

2. The core of claim 1, wherein a flat face of the coil section is offset to a flat face of at least one of the armature abutment section and the armature bearing section.

3. The core of claim 1, wherein the coil section is offset from both the armature abutment section and the armature bearing section in a direction perpendicular to the longitudinal axis.

4. The core of claim 1, wherein the armature abutment section and the armature bearing section are aligned with one another.

5. The core of claim 1, wherein a height of the coil section in a direction perpendicular to the longitudinal axis is smaller than a height of the armature bearing section.

6. The core of claim 1, wherein a material thickness of the armature bearing section is smaller than or equal to a material thickness of the coil section.

7. The core of claim 1, wherein the coil section forms a constriction of the core in a direction perpendicular to the longitudinal axis.

8. The core of claim 1, wherein the armature abutment section, the armature bearing section, and the coil section are formed integrally with one another as a monolithic core.

9. The core of claim 1, wherein the coil section forms an embossment of the core.

10. The core of claim 1, wherein a flange is disposed at at least one of the transition areas and separates the coil section from at least one of the armature abutment section and the armature bearing section.

11. The core of claim 10, wherein the flange and a mounting bracket attached to the armature bearing section for mounting the armature are formed integrally with one another as a monolithic part.

12. A magnetic assembly for a switching device, comprising:

a core including an armature abutment section, an armature bearing section, and a coil section extending along a longitudinal axis from the armature abutment section to the armature bearing section, the coil section and at least one of the armature abutment section and the armature bearing section extend along separate planes offset from one another perpendicular to the longitudinal axis, a step is formed at a transition area between the coil section and at least one of the armature abutment section and the armature bearing section, the step is an inclined part that is inclined to the longitudinal axis at an angle greater than 0° and less than 90° and connects a part of the coil section that is parallel to the longitudinal axis to a part of the armature abutment section and/or the armature bearing section that is parallel to the longitudinal axis, the armature abutment section and the armature bearing section each have a pair of wings extending beyond the coil section parallel to a vertical axis;

a coil arranged on the coil section; and an armature mounted to the armature bearing section, the armature has a frame framing an opening, the coil section is at least partially received in the opening.

13. The magnetic assembly of claim 12, wherein the armature is movable from an open configuration in which the armature is distanced from the armature abutment section to a closed configuration in which the armature abuts the armature abutment section.

14. A switching device, comprising:

a magnetic assembly including a core, a coil, and an armature, the core has an armature abutment section, an armature bearing section, and a coil section extending along a longitudinal axis from the armature abutment section to the armature bearing section, the coil section and at least one of the armature abutment section and the armature bearing section extend along separate planes offset from one another perpendicular to the longitudinal axis, a step is formed at a transition area between the coil section and at least one of the armature abutment section and the armature bearing section, the step is an inclined part that is inclined to the longitudinal axis at an angle greater than 0° and less than 90° and connects a part of the coil section that is parallel to the longitudinal axis to a part of the armature abutment section and/or the armature bearing section that is parallel to the longitudinal axis, the coil is arranged on the coil section, the armature abutment section and the armature bearing section each have a pair of wings extending beyond the coil section parallel to a vertical axis, the armature has a frame framing an opening, the coil section is at least partially received in the opening.

15. The switching device of claim 14, wherein the switching device is an electromagnetic relay.

16. The core of claim 1, wherein a material thickness of the armature bearing section along a lateral axis perpendicular to the longitudinal axis is smaller than a material thickness of the coil section along the lateral axis.

17. The core of claim 16, wherein a height of the coil section along the vertical axis perpendicular to the longitudinal axis and perpendicular to the lateral axis is smaller than a height of the armature bearing section along the vertical axis.

18. The core of claim 16, wherein a material thickness of the armature abutment section along the lateral axis is larger than the material thickness of the armature bearing section along the lateral axis.

19. The core of claim 1, wherein the frame encloses the opening.

20. The core of claim 1, wherein the frame has an axially extending notch, and a mounting bracket attached to the armature bearing section has a locking latch, the locking latch extends into the axially extending notch.

* * * * *